US012139940B2

(12) United States Patent
Müller et al.

(10) Patent No.: US 12,139,940 B2
(45) Date of Patent: Nov. 12, 2024

(54) PRODUCT ANTI-THEFT DEVICE, IN PARTICULAR FOR TEXTILE PRODUCTS

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 275 days.

(21) Appl. No.: 17/439,329

(22) PCT Filed: Mar. 10, 2020

(86) PCT No.: PCT/EP2020/056400
§ 371 (c)(1),
(2) Date: Sep. 14, 2021

(87) PCT Pub. No.: WO2020/200668
PCT Pub. Date: Aug. 10, 2020

(65) Prior Publication Data
US 2022/0178176 A1 Jun. 9, 2022

(30) Foreign Application Priority Data
Apr. 3, 2019 (DE) ..................... 10 2019 204 779.3

(51) Int. Cl.
*E05B 73/00* (2006.01)
*E05B 47/06* (2006.01)
(Continued)

(52) U.S. Cl.
CPC ...... *E05B 73/0017* (2013.01); *E05B 47/0603* (2013.01); *G08B 13/149* (2013.01); *G08B 13/2434* (2013.01)

(58) Field of Classification Search
CPC ...... E05B 47/00; E05B 47/06; E05B 47/0603; E05B 47/0607; E05B 47/0611;
(Continued)

(56) References Cited

U.S. PATENT DOCUMENTS 3,689,736 A * 9/1972 John ........................ A45D 2/36 219/241
5,068,641 A 11/1991 Hogen
(Continued)

FOREIGN PATENT DOCUMENTS

EP 0266294 5/1988
EP 0385540 A1 * 2/1990
(Continued)

OTHER PUBLICATIONS

Application No. PCT/EP2020/056400, International Search Report and Written Opinion, Mailed On Jun. 26, 2020, 13 pages.

*Primary Examiner* — Nathan Cumar
(74) *Attorney, Agent, or Firm* — Kilpatrick Townsend & Stockton LLP

(57) ABSTRACT

The invention relates to a product anti-theft device, which is designed to be attached to products that are to be protected, in particular textile products, the anti-theft device comprising a housing and a locking mechanism, which locking mechanism comprises a needle, the needle being movable between an engaged position, in which it engages with the product that is to be protected, and a release position, in which it allows the product anti-theft device to be released and removed from the product that is to be protected.

18 Claims, 5 Drawing Sheets

Figure 1:
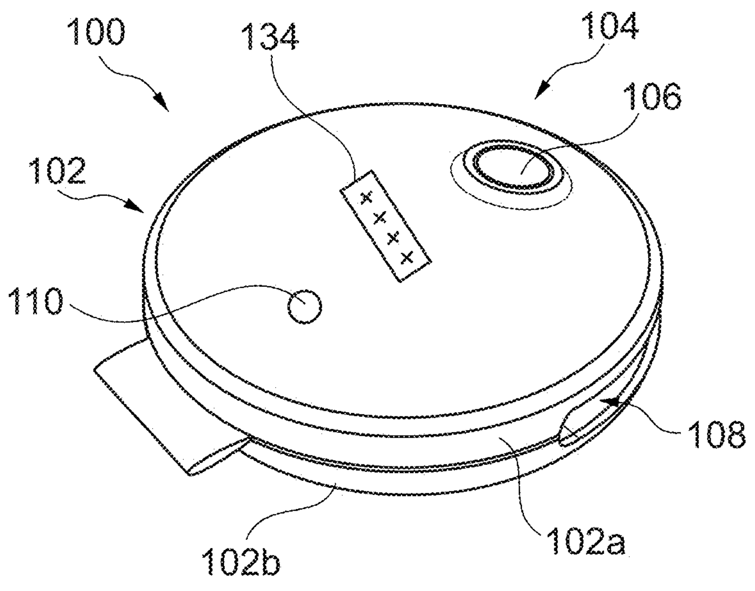

(51) Int. Cl.
*G08B 13/14* (2006.01)
*G08B 13/24* (2006.01)

(58) Field of Classification Search
CPC ..... E05B 47/0615; G08B 13/00; G08B 13/14; G08B 13/149; G08B 13/22; G08B 13/2428; G08B 13/2431; G08B 13/2434
USPC ........................................................... 70/57
See application file for complete search history.

(56) References Cited

U.S. PATENT DOCUMENTS

| | | | |
|---|---|---|---|
| 6,449,991 | B1 | 9/2002 | Hogan |
| 2010/0171620 | A1 | 7/2010 | Stoltz et al. |
| 2016/0258192 | A1* | 9/2016 | Bouan .................. E05B 39/002 |
| 2016/0321894 | A1* | 11/2016 | Schneider ............ G08B 13/242 |
| 2016/0364969 | A1* | 12/2016 | Casanova ............ G08B 13/242 |
| 2017/0193777 | A1* | 7/2017 | Sayegh .............. G08B 13/2465 |
| 2019/0073886 | A1 | 3/2019 | Strulovitch et al. |

FOREIGN PATENT DOCUMENTS

| | | |
|---|---|---|
| EP | 0385540 | 9/1990 |
| WO | 0179635 | 10/2001 |
| WO | 2008153476 | 12/2008 |
| WO | 2016141039 | 9/2016 |

* cited by examiner

PRODUCT ANTI-THEFT DEVICE, IN PARTICULAR FOR TEXTILE PRODUCTS

CROSS REFERENCE TO RELATED APPLICATION

This application is a U.S. national phase of International Patent Application No. PCT/EP2020/056400 filed on Mar. 10, 2020, which claims priority to German Patent Application No. 10 2019 204 779.3, filed in Germany on Apr. 3, 2019. The entire contents of both applications are hereby incorporated herein by this reference.

The invention relates to a product anti-theft device which is designed to be attached to products that are to be protected, in particular textile products, the anti-theft device comprising a housing and a locking mechanism, which locking mechanism comprises a needle, the needle being movable between an engaged position, in which it engages with the product that is to be protected, and a release position, in which it allows the product anti-theft device to be released and removed from the product that is to be protected.

Such product anti-theft devices are generally known and have been used for many years in publicly accessible department stores, since they can ensure adequate protection with regard to unauthorised removal of products from the department store or from a retail area within the department store. For this purpose, corresponding detector units are generally provided at all entrances and exits of the department store or the respective retail areas within the department store, which units are designed and intended to emit an acoustic and/or visual warning signal if a customer attempts to remove a protected product to which such a product anti-theft device is attached from the department store or the retail area without authorisation, i.e. without paying for the product in advance.

If a generic product anti-theft device is used to protect textile products, such product anti-theft devices often comprise a two-part housing, a first housing part usually being attached to an outside of the textile product and a second housing part being attached to a corresponding inside of the textile product in order to assemble the anti-theft device on the textile product that is to be protected. The part of the textile product that is between the two housing parts is then pierced with a pointed needle that was, for example, already attached to one of the two housing parts, so that the needle can snap into the other of the two housing parts, whereby the textile product and the two housing parts are connected to one another by the needle in such a way that the product anti-theft device can no longer be removed from the product that is to be protected or at least not without at least partially destroying the product that is to be protected.

In order to open the locking mechanism of a product anti-theft device attached to a textile product in this way, appropriate unlocking devices, which can usually only be operated by retail staff, are generally provided in the service or checkout area of a department store, which unlocking devices, for example, are magnet-based or operated mechanically in another way and are designed and intended to release the locking mechanism of the product anti-theft device so that the needle can be removed from the product anti-theft device and the two housing parts of the product anti-theft device can be separated from one another again. The product anti-theft devices, which have been disassembled into their individual components, are then often initially collected at the place of their disassembly and used again at a later point in time by being reattached to other products that are to be protected in the manner described above.

It should be noted, however, that especially during an assembly and/or disassembly process of such product anti-theft devices, there can be an increased risk of injury for the retail staff, since the handling of a needle, which is usually an extremely sharp object, always involves a certain risk of injury. In addition, during the usual large number of assembly and/or disassembly processes, the needle or the housing part of the product anti-theft device that includes the needle may fall to the floor unnoticed, so that there is ultimately an increased risk of injury not only for the retail staff but also for customers.

To counteract the above-mentioned disadvantages of an increased risk of injury and complicated handling of multi-part housings, product anti-theft devices with a one-piece housing have already been proposed in the past in which the needle is sunk into a receiving space provided on the housing of the product anti-theft device when said device is open. Since, however, in addition to the receiving space provided for sinking the needle, further components of the locking mechanism which interact with the needle are usually also provided, such product anti-theft devices generally have dimensions in the axial direction of the needle in an order of magnitude that is perceived as particularly disturbing, especially when trying on a particular textile product, and can thus adversely affect the entire trying-on and sales process.

It is therefore the object of the present invention to provide a product anti-theft device which is able to provide a reduced risk of injury and simple handling while at the same time having compact dimensions.

According to the invention, this object is achieved by a product anti-theft device of the type mentioned above in which the housing has a substantially flat form with a main plane, and the locking mechanism also comprises a needle-receiving element attached to the housing, on which needle-receiving element the needle is fixedly held and which needle-receiving element is displaceable in a direction substantially orthogonal to the main plane of the housing in order to transfer the needle from the engaged position into the release position and from the release position into the engaged position, the needle-receiving element being substantially fully accommodated in the housing when the needle is in the engaged position.

Since the product anti-theft device according to the invention comprises a housing with a substantially flat form, it can firstly be ensured that the product anti-theft device has reduced dimensions in a direction substantially parallel to an axial extension direction of the needle. If the product anti-theft device according to the invention is attached to a textile product, for example, it can be ensured as a result that a customer trying on this textile product is only disturbed to the very slightest extent by the product anti-theft device. As a result of the fact that the locking mechanism also comprises a needle-receiving element attached to the housing for receiving the needle, which needle-receiving element is displaceable in a direction substantially orthogonal to the main plane of the housing of the product anti-theft device and which needle-receiving element is substantially fully accommodated in the housing when the needle is in the engaged position, no receiving space needs to be provided in the axial extension direction of the needle, which receiving space is specially designed to receive the needle in the release position. Rather, according to the invention, the needle moves together with the needle-receiving element between the engaged position and the release position. The inventors have recognised that minimising the dimensions of the product anti-theft device in a direction substantially parallel to the axial extension direction of the needle is particularly important when the product anti-theft device is attached to the product that is to be protected, i.e. the needle of the product anti-theft device is in the engaged position. However, if the needle is in its release position, the product anti-theft device is usually not attached to the product that is to be protected or is about to be removed from the product that is to be protected, so that the dimensions of the product anti-theft device in the direction substantially parallel to the axial extension direction of the needle only play a subordinate role. In this case, it is conceivable, for example, to displace the needle-receiving element together with the needle out of the housing in a direction substantially parallel to the axial extension direction of the needle when the needle is transferred into its release position. Furthermore, since the needle-receiving element and the needle preferably always remain attached to the housing when the product anti-theft device is in operation, i.e. the needle and the needle-receiving element cannot be removed from the product anti-theft device or at least cannot be removed without great force, the needle and/or the needle-receiving element generally cannot fall unnoticed to the floor, nor must the needle and/or the needle-receiving element be handled as a separate component, so that the product anti-theft device according to the invention has a reduced risk of injury compared to known product anti-theft devices of the generic type. Finally, the product anti-theft device according to the invention also has the advantages known from one-piece product anti-theft devices in terms of quick and efficient handling during assembly on or removal from products that are to be protected.

So that it can also be ensured to a particular degree that the product anti-theft device cannot be opened in an unauthorised manner, i.e., for example, before the completion of a payment process, it is further proposed according to the invention that the locking mechanism also comprises a locking element, preferably a slide, which is designed in such a way that it can be brought into a releasable engagement connection with the needle-receiving element, so that the needle is fixedly held in the engaged position, and upon actuation by a release element operatively connected to said locking element, the engagement connection is released, so that a displacement of the needle-receiving element and thus the transfer of the needle into the release position are permitted. The locking element can preferably be spring-loaded in the direction of the engagement connection, for example into a closed position.

In principle, the release element can be designed as a mechanically and/or motor-operated release element. In order to implement a particularly compact and reliable embodiment of the invention, however, it is proposed that the release element is at least partially made of a shape memory alloy. Here, for example, thermally and/or magnetically activated shape memory alloys can be used, which are preferably designed in such a way that they have a resting or basic state in which the locking element remains locked so that the needle is fixedly held in the engaged position, and an excited state in which the locking element is actuated in such a way that a displacement of the needle-receiving element and thus the transfer of the needle into the release position are permitted. If the release element is at least partially made of a thermally activated shape memory alloy, the shape memory alloy can be activated, for example, by applying electrical energy, preferably by applying an electrical voltage, to the shape memory alloy itself.

If the release element is at least partially made of a thermally activated shape memory alloy, it is also preferable in a further development of the invention that the locking element is at least partially made of a material that has a temperature resistance of at least 100° C., preferably of at least 125° C., particularly preferably of at least 150° C.

In order to implement the engagement connection to be created between the locking element and the needle-receiving element when the needle is in the engaged position, it is also proposed according to a further embodiment of the invention that the locking element has at least one depression and/or at least one projection which is formed counter-shaped to at least one corresponding depression and/or at least one corresponding projection on the needle-receiving element. Here, the locking element can be equipped, for example, with a pin-like projection which can be brought into engagement with a hole-like depression on the needle-receiving element. To provide a more stable engagement connection, however, it is additionally or alternatively also conceivable that the locking element is provided with a semi-circular cut-out projection which can be brought into engagement with a corresponding, preferably annular, groove on the needle-receiving element. However, if a particularly stable engagement connection is to be created between the locking element and the needle-receiving element, which engagement connection can withstand a particularly high maximum permissible force, a toothing can be formed on the locking element and a corresponding counter-toothing can be formed on the needle-receiving element. The toothing and the counter-toothing can preferably be designed in such a way that a movement of the needle-receiving element from the release position into the engaged position is always permitted, but movement of the needle-receiving element from the engaged position into the release position is prevented as long as the toothing and the counter-toothing are in engagement with one another.

In a further development of this embodiment of the invention, it is also conceivable that the needle-receiving element has at least one further depression and/or at least one further projection, which is provided to engage with the at least one depression and/or the at least one projection of the locking element, if desired, so that the needle can also be blocked in the release position.

In order to be able to transfer the product anti-theft device particularly easily into a closed state starting from an open state in which the needle is in its release position, it is proposed according to a further embodiment of the invention that the needle-receiving element is also designed in such a way that in the release position of the needle, said needle-receiving element protrudes outwards from the housing in a direction substantially orthogonal to the main plane of the housing and, upon manual actuation by an operator, can be substantially fully accommodated in the housing, so that the needle is transferred into the engaged position. In connection with this embodiment, it can also be advantageous if the needle-receiving element is substantially button-like and/or cylindrical on a side facing away from a free end of the needle in order to enable particularly comfortable actuation. Furthermore, it is proposed in connection with this embodiment that a portion of the needle-receiving element which is only visible to a person handling the product anti-theft device when the needle-receiving element and thus the needle are in the release position is a contrasting colour from the rest of the housing of the product anti-theft device so that it can be quickly identified whether the product anti-theft device is locked or unlocked.

In addition, in order to enable particularly convenient opening of the product anti-theft device, for example after completing a payment process for the protected product, it is proposed in a further development of the invention that the needle-receiving element and thus the needle are preloaded in the direction of the release position, preferably by means of a spring. It can thus be ensured that the needle-receiving element and thus the needle, if desired, can be transferred into the release position without additional effort, for example through potential energy stored in the spring.

In the event that the product anti-theft device is attached to the product that is to be protected, i.e. the needle engages with the product that is to be protected, it should ideally be ensured that the product anti-theft device cannot be removed when the needle is in the engaged position without damaging the protected product. However, if the protected product is, for example, a textile product made of a particularly tear-resistant material, there is a risk that the needle will be bent away from the protected product when the product anti-theft device is pulled, which in the worst case can lead to the protected product being removed when the product anti-theft device is closed. To counter this circumstance, it is proposed according to a particularly preferred embodiment of the invention that the housing also has a recess which is designed and intended to receive a free end of the needle when the needle is in the engaged position, the recess preferably having an insert which is further preferably made of an electrically conductive material. As a result, the needle can also be safely guided at its free end, i.e. at the end facing away from the needle-receiving element, and unauthorised removal of the product anti-theft device can thus be prevented even more reliably. The insert can be made of a high-strength material, for example metal. If the insert is also electrically conductive, unauthorised and/or violent opening can also be detected by monitoring and interrupting a circuit that runs through the needle and the insert, with which the needle is preferably in contact in its engaged position and, if desired, by emitting an alarm signal.

So that the product anti-theft device is generally comfortable to handle and/or also meets aesthetic requirements in connection with certain products that are to be protected, it is also preferred that the housing has a substantially circular and/or elliptical and/or teardrop-shaped or polygonal contour.

So that the product anti-theft device also has a sufficient degree of freedom with regard to different types and/or locations of attachment to products that are to be protected, the housing can also have a cut-out which preferably extends substantially radially, the cut-out being designed to receive at least part of the product that is to be protected. The cut-out can be, for example, in the form of an incision along a sectional plane substantially parallel to the main plane of the housing. Preferably, however, the cut-out is only so pronounced in the extension direction substantially orthogonal to the main plane of the housing that it runs between two wall portions of the housing, which wall portions are located above or below the main plane of the housing. In addition, the cut-out can have a predetermined extent in the radial direction which, for example, corresponds to only approximately half the radial extent of the housing or less and/or an angular extent which is preferably at least 45°, more preferably at least 90°, particularly preferably at least 180°.

In this context, it should also be pointed out that the needle-receiving element is preferably arranged in the region of this cut-out so that the needle can pierce the part of the product that is to be protected that is received therein. With regard to the positioning of the needle-receiving element in relation to the cut-out, many different variants are conceivable. The needle-receiving element can, for example, be positioned centrally in relation to the cut-out or on an outer edge region of the cut-out.

In principle, it is conceivable to supply the product anti-theft device with any external energy required for operation. However, if the product anti-theft device should also act autonomously or at least partially autonomously and/or, for example, be able to open without an external energy supply or have other functions that require a regular energy supply, it is preferred that the product anti-theft device also comprises an energy storage unit, preferably a battery and/or a capacitor. The energy storage unit can in particular be arranged in or on the housing of the product anti-theft device and can preferably be charged repeatedly. To extend the replacement interval of the energy storage unit, an energy recovery unit, for example in the form of a solar cell, can also be provided on the outside of the housing.

To implement a particularly convenient opening of the product anti-theft device, it is proposed in a further development of the invention that the product anti-theft device also comprises a signal-receiving unit, the product anti-theft device being designed to transfer the needle into the release position upon receipt of a release initiation signal by the signal-receiving unit. The release initiation signal can be provided for opening a single predetermined product anti-theft device and/or for opening several predetermined product anti-theft devices. The release initiation signal is preferably an encrypted signal. An encrypted signal can in particular protect against undesired attempts at manipulation and/or counteract unauthorised opening of the product anti-theft device.

The signal-receiving unit can in principle be designed in such a way that the release initiation signal can be transmitted to the signal-receiving unit by means of a wireless connection (e.g. WLAN, Bluetooth, etc.) through a central control unit, preferably located near the product anti-theft device. However, it is also conceivable that the signal-receiving unit is designed and intended to receive signals from a mobile terminal, preferably a customer's mobile terminal. In this way, it is also possible for a customer to remove the product anti-theft device from the protected product independently and without further assistance from additional retail staff.

In general, it is preferable to use a communication standard for signal transmission that provides compatibility with a particularly large number of such mobile terminals. In addition, it can be desirable to use encrypted signals in order to be able to guarantee a particularly secure connection. Furthermore, it is advantageous to use a communication standard that has a particularly low energy requirement, so that, for example, the battery of the product anti-theft device can be saved. Here, for example, Bluetooth provides a communication standard that is particularly well suited to meeting these latter requirements.

In principle, however, the signal unit receiving unit does not have to be restricted to being able to only receive release initiation signals. If, for example, product-related and/or other information is also to be received by and stored on the product anti-theft device for a specific and/or indefinite period of time, it can be provided according to a further development of the invention that the product anti-theft device also comprises a memory device, the product anti-theft device preferably also being designed to receive a product information signal and to store it on the memory device. The product information signal can include product-related and/or other information such as a price, in particular a customer-specific price, and/or an item/manufacturer code and/or size information and/or availability information and/or other similar information relating to the product protected by the product anti-theft device. In an analogous manner, the product information signal can also be transmitted to the product anti-theft device via a central control unit, preferably located near the product anti-theft device, for example by means of a wireless connection (e.g. WLAN, NFC, RFID, Bluetooth, etc.). However, it is also conceivable here for the product information signal to be transmitted to the product anti-theft device via the wireless connection by a mobile terminal, preferably a customer's mobile terminal. If the mobile terminal is a customer's mobile terminal, it is also possible to transfer a price that is individually assigned to the respective customer to the product anti-theft device. The price can be provided by an application that is preinstalled on the mobile terminal and communicates with a product sales system, for example an app. In this way, it is also possible for a customer to be able to carry out the entire sales process, i.e. paying for and removing the product anti-theft device from the protected product, independently and without further assistance from additional retail staff.

In principle, in addition to a signal-receiving unit, the product anti-theft device can also additionally or alternatively comprise a signal-transmitting unit, which is preferably designed to transmit a product information signal to a mobile terminal in response to a product information request process. The product information request process can include both receiving a corresponding request signal and manually actuating the product anti-theft device, each time causing the signal-transmitting unit to transmit the product information signal over a certain period of time.

If the product anti-theft device comprises both a signal-receiving unit and a signal-transmitting unit, bidirectional communication between the mobile terminal and the product anti-theft device can be provided. It is also conceivable here that the product anti-theft device can be located by the mobile terminal while they are in communication with one another. Thus, for example, a customer can be guided in a simple manner to a product he or she is looking for with the product anti-theft device attached thereto. In this case, for example, Bluetooth is again suitable as a particularly preferred communication standard.

In order to be able to provide a particularly good identification and/or location function of the product anti-theft device, the product anti-theft device can also be assigned a unique identification code, for example an identification number, which is preferably provided to identify the product protected by the product anti-theft device and, if desired, to determine a location of the product anti-theft device. The unique identification code can be transferred to the product anti-theft device, preferably by means of Bluetooth, and stored by a memory device of the product anti-theft device.

So that the product anti-theft device can also be used in a particularly diverse way, the signal-receiving unit and/or the signal-transmitting unit can also be designed and intended to be able to communicate with mobile terminals such as smartphones and/or tablet PCs and/or smartwatches.

In order to be able to further ensure that the product anti-theft device is only removed by authorised persons or only when the protected product has already been paid for, it is proposed in a further development of the invention that the product anti-theft device also comprises an alarm-generating device which is designed to emit an acoustic and/or visual alarm signal in response to attempted unauthorised removal of the product anti-theft device from the product that is to be protected. The alarm-generating device can preferably be designed in such a way that the alarm signal is only emitted when the locking mechanism is in the locked state. In a further development, it can also be provided here that the alarm-generating device emits a release tone or a release tone sequence when the needle can be moved into the release position and/or when the needle has been moved into the release position.

In order to be able to reliably detect undesired attempts at manipulation on the housing of the product anti-theft device and/or the locking mechanism, in particular the needle, of the product anti-theft device, it is proposed according to a particularly preferred embodiment of the invention that the product anti-theft device also comprises a sensor unit, for example a Hall sensor unit, attached to the housing, which sensor unit is designed and intended to detect a position and/or a displacement of the needle and/or of the needle-receiving element, and/or that the product anti-theft device also comprises a photodiode attached to an inner portion of the housing and/or to an outer portion of the housing.

The photodiode arranged on an outer portion of the housing can, for example, help to detect when the product anti-theft device has been packed together with the protected product in a so-called "booster bag", i.e. in a bag lined with aluminium foil, which is intended to allow the product anti-theft device together with the protected product to pass through the detector unit of a department store unnoticed, i.e. without an alarm signal being emitted by a detector unit. This is made possible by monitoring the brightness value detected by the photodiode attached to an outer portion of the housing, which brightness value can be determined in a manner known to a person skilled in the art, for example from a photocurrent and/or a photovoltage. If the product anti-theft device according to the invention also includes the alarm-generating device explained above, the photodiode attached to an outer portion of the housing can be operatively connected to the alarm-generating device and the alarm-generating device can preferably also be designed to emit the alarm signal precisely when the brightness value detected by the photodiode attached to an outer portion of the housing falls below a predetermined limit value.

Similarly, the photodiode attached to an inner portion of the housing can help to detect, for example, when the housing is being forcibly opened by monitoring the brightness value detected by the photodiode attached to an inner portion of the housing. If the product anti-theft device according to the invention also includes the alarm-generating device explained above, the photodiode attached to an inner portion of the housing can be operatively connected to the alarm-generating device and the alarm-generating device can preferably also be designed to emit the alarm signal precisely when the brightness value detected by the photodiode attached to an inner portion of the housing exceeds a predetermined limit value.

In order to also be able to show in a simple manner whether the product anti-theft device is in an operational state and/or a locked state and/or an unlocked state and/or whether there is possibly a malfunction of the product anti-theft device and/or whether the battery of the product anti-theft device needs to be charged, the anti-theft device can also comprise a display unit, for example a display and/or an LED light source, which is provided on an outer surface of the housing. The display can be, for example, a so-called "e-paper display" or an "e-ink display". The product information explained above can preferably also be shown on the display. It goes without saying, however, that in principle only a barcode or other ID can be attached to the housing of the product anti-theft device.

The LED light source can be designed, for example, as a single- or multi-coloured LED light source. In this context, it is also conceivable that the housing is preferably covered with a translucent textile which can be illuminated by the LED light source. Additionally or alternatively, it is also conceivable that such an LED light source is provided on the needle-receiving element.

It should also be added that the product anti-theft device according to the invention can also comprise a surveillance element, for example a so-called electronic article surveillance element (EAS element for short), which EAS element is designed to interact with a preferably electronic article surveillance system. In particular, it can be provided that, if a customer tries to remove a protected product to which the product anti-theft device according to the invention is attached from a department store or retail area without authorisation, i.e. without paying for said product beforehand, a preferably acoustic and/or visual alarm signal is emitted. The alarm signal can be emitted, for example, precisely when the product anti-theft device is passed through a detector unit assigned to the electronic article surveillance system. The alarm signal can be emitted on the detector unit itself and/or on the product anti-theft device, with a corresponding alarm device being provided, if desired, which alarm device is designed to emit the alarm signal. The EAS element can alternatively or additionally be supported by, for example, an RFID, Bluetooth and/or WLAN chip module, which is preferably designed to be able to clearly identify the product anti-theft device.

In order to also be able to ensure that a customer, after paying for the product and removing the product anti-theft device independently, cannot remove the product anti-theft device from the retail area unnoticed, it is also conceivable that the alarm signal can also emitted when the customer has already paid for the product protected by the product anti-theft device. In this way it can be guaranteed, in principle, that product anti-theft devices are used repeatedly and cannot be taken away unnoticed and/or accidentally by customers.

Figure 2A:
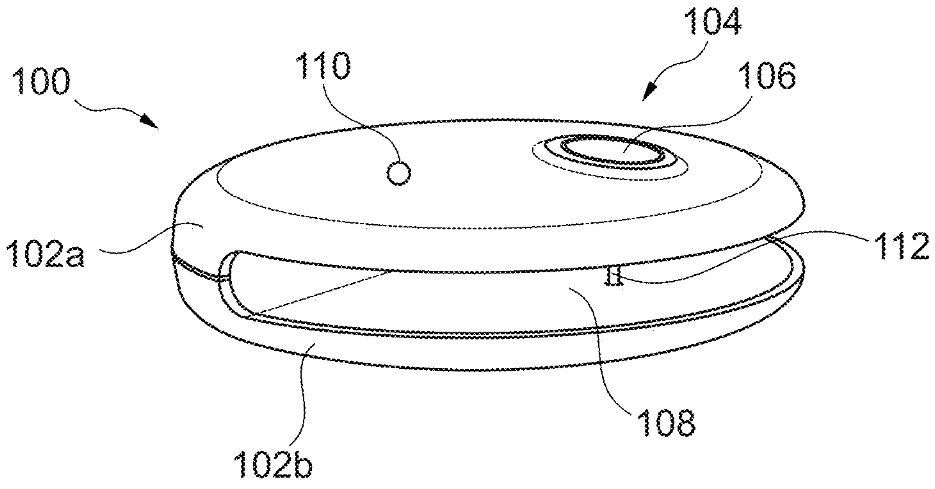
Figure 2B:
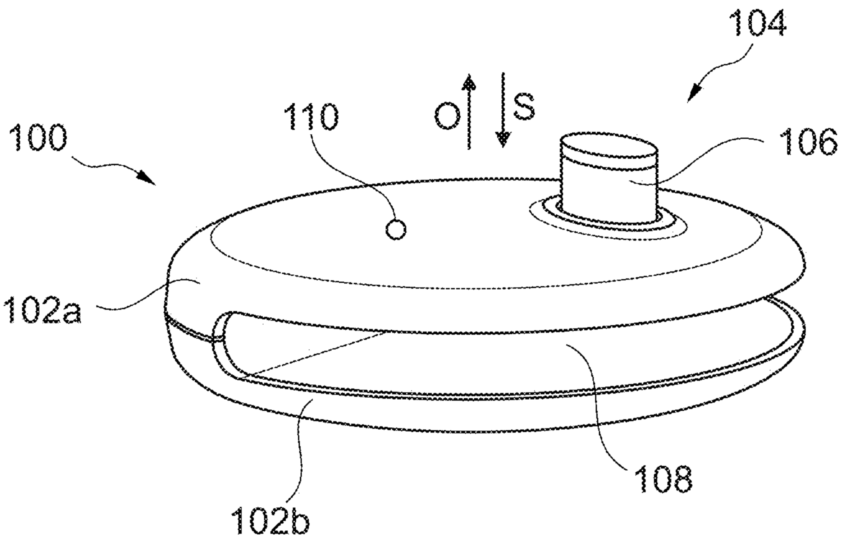
Figure 3:
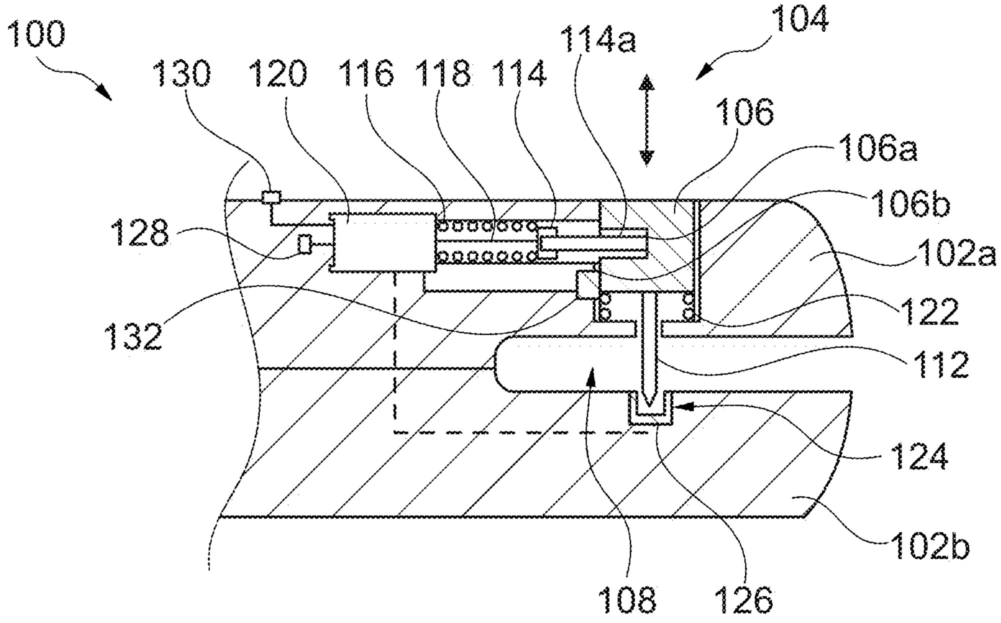
Figure 4:
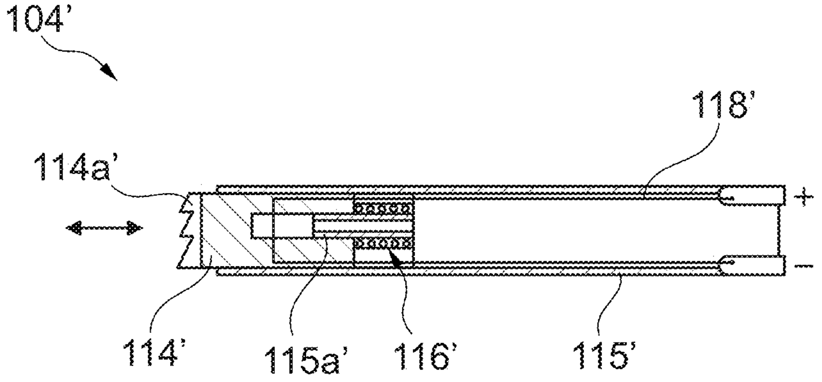

The invention will be explained in more detail below with reference to the accompanying drawings. In the drawings:

FIG. 1 is a perspective view of an embodiment of a product anti-theft device according to the invention in a locked state, FIGS. 2*a* and 2*b* are each a perspective view of the embodiment of the product anti-theft device according to the invention in a locked (2*a*) or an unlocked (2*b*) state, FIG. 3 is a schematic sectional view of the embodiment of the product anti-theft device according to the invention, to explain the functioning of the locking mechanism, and FIG. 4 is a schematic sectional view of part of an alternative embodiment of the locking mechanism from FIG. 3.

In FIG. 1, a product anti-theft device according to the invention is generally designated by 100. The product anti-theft device 100 comprises a housing 102 which, in the embodiment shown, has an upper housing half 102*a* and a lower housing half 102*b*. Furthermore, the product anti-theft device 100 comprises a locking mechanism 104, of which, however, only the needle-receiving element 106 can be seen in FIG. 1, which needle-receiving element is displaceably attached to the upper housing half 102*a*. The locking mechanism 104 is in a locked state in FIG. 1, which locked state can be seen from the fact that the needle-receiving element 106 is substantially fully accommodated in the upper housing half 102*a*. The locking mechanism 104 will be explained in more detail with reference to FIGS. 2 to 4. To accommodate a part of a product that is to be protected (not shown in FIG. 1), for example a part of a textile product, the product anti-theft device also comprises a cut-out 108 which extends substantially radially. In the embodiment shown, the cut-out is in the form of an incision along a sectional plane substantially parallel to a main plane of the housing 102. Finally, FIG. 1 also shows an LED light source 110 arranged on an outer surface of the upper housing half 102*a*, which LED light source can be designed as a coloured LED light source and is designed, for example, to display a status of the product anti-theft device 100. For example, the LED light source 110 can light up red when the product anti-theft device 100 is in a locked state, while it can light up green, for example, when the product anti-theft device 100 is in an unlocked state.

FIG. 2*a* shows the product anti-theft device 100 according to the invention from FIG. 1, but from a different perspective. As can also be seen in FIG. 2*a*, the locking mechanism 104 comprises a needle 112 attached to the needle-receiving element 106. In FIG. 2*a*, the needle 112 is in an engaged position in which it pierces the part of a product that is to be protected, for example the part of a textile product received in the cut-out 108, so that the product anti-theft device 100 can be securely connected to the product that is to be protected. As long as the needle 112 is in the engaged position, the product that is to be protected and the product anti-theft device 100 consequently cannot be separated from one another, or at least not without at least partially destroying the product that is to be protected.

FIG. 2*b* now shows the product anti-theft device 100 according to the invention from FIG. 2*a*, after it has been transferred into an unlocked state. In order to transfer the product anti-theft device 100 from the locked state shown in FIG. 2*a* into the unlocked state shown in FIG. 2*b*, the needle-receiving element 106 displaceably attached to the upper housing half 102*a* is moved out of the housing 102 in the opening direction O indicated in FIG. 2*b*, preferably supported by a spring accommodated in the upper housing half 102 and connected to the needle-receiving element 106, so that the needle-receiving element protrudes outward from the housing 102 in a direction substantially orthogonal to a main plane of the housing 102. As a result, the needle 112, which is fixedly connected to the needle-receiving element 106, is raised in such a way that the cut-out 108 is substantially fully released. In FIG. 2*b*, the needle 112 is consequently in a release position in which the product anti-theft device 100 can be released and removed from the product that is to be protected. In the release position, the needle 112 is preferably fully accommodated within the upper housing half 102*a*, so that any possible catching of the product that is to be protected on a pointed end of the needle 112 when the product anti-theft device 100 is removed is prevented.

If the product anti-theft device 100 is to be transferred from the unlocked state shown in FIG. 2*b* into the locked state shown in FIG. 2*a*, this can be done, for example, by again sinking the needle-receiving element 106 substantially fully in the upper housing half 102*a* by manual actuation according to a closing direction S indicated in FIG. 2*b*, so that the needle 112 connected to the needle-receiving element 106 again assumes the engaged position shown in FIG. 2*a* and preferably latches into said engaged position.

With reference to FIG. 3, which is a schematic sectional view of the embodiment of the product anti-theft device 100 according to the invention, the mode of operation of the locking mechanism 104 will now be explained in more detail. In order to be able to ensure that the needle-receiving element 106 and thus the needle 112 can be securely held in the engaged position when the product anti-theft device 100 is in the locked state, the locking mechanism 104 also comprises a slide 114 which is axially displaceable in the upper housing half 102*a* and is designed to engage with a groove 106*a* provided on the needle-receiving element 106. The slide 114 is preloaded in the direction of the groove 106*a* by means of a spring 116, so that the slide 114 can engage with its free end 114*a* with the groove 106*a* as soon as the needle-receiving element 106 has assumed its locking position shown here. To open the product anti-theft device 100, the slide 114 is also connected to a release element 118 which, in the embodiment shown, is designed as a wire 118 made of a shape memory alloy. The wire 118 is in turn connected to a chip unit 120. If the wire 118 is heated by the chip unit 120, for example by applying an electrical voltage, the wire contracts, so that the slide 114 is moved in the direction of the chip unit 120 and out of the groove 106*a*. As soon as the slide 114 and the needle-receiving element 106 have been disengaged, the needle-receiving element 106 can thus move upwards out of the upper housing half 102*a*, as a result of which the needle 112 is transferred into its release position.

The energy required for heating the wire 118 can be provided, for example, by a battery (not shown in FIG. 3), which battery can be integrated into the chip unit 120 and/or operatively connected thereto and likewise accommodated in the housing 102. The movement of the needle-receiving element 106 out of the upper housing half 102*a* can be supported by a spring 122. The spring 122 can be fixedly connected at its lower end to the upper housing half 102*a* and at its upper end to the needle-receiving element 106, so that the needle-receiving element 106, which is displaceably attached in the upper housing half 102*a*, can be prevented from falling out. After the heating of the wire 118 is stopped again, the slide 114 can again be moved, assisted by the spring 116, in the direction of the needle-receiving element 106.

As long as the needle 112 is in the release position, the slide 114 can remain in contact with an outer wall 106*b* of the needle-receiving element 106. As soon as the needle-receiving element 106 is again sunk into the upper housing half 102*a* in order to transfer the needle 112 into its engaged position, the slide 114, supported by the spring 116, can finally move back into the groove 106*a* and engage with said groove in such a way that the needle-receiving element 106 and thus the needle 112 can be securely held in the engaged position.

Alternatively, a further groove (not shown in FIG. 3) can also be provided below the groove 106*a*, which groove can substantially correspond to the groove 106*a* in terms of its shape. The further groove can be provided so that the needle-receiving element 106 and thus the needle 112 can also be locked in the release position, in that the slide 114, supported by the spring 116, moves into the further groove as soon as the heating of the wire 118 is stopped again. Consequently, the needle-receiving element 106 and the needle 112 can only be transferred back into the engaged position when the wire 118 is heated again and the slide 114 is moved out of the further groove.

It should also be added that a recess 124 can also be provided on the lower housing half 102*b*, which recess is designed to receive a free end of the needle 112 when the needle 112 is in the engaged position. The recess 124 can be provided with an electrically conductive insert 126. The insert 126 can in turn be connected to the chip unit 120 in an electrically conductive manner, as is only shown schematically in FIG. 3 by means of a dashed line. If the needle 112 is also connected to the chip unit 120 via the needle-receiving element 106, the slide 114 and the wire 118, a closed circuit is created when the needle 112 is in its engaged position, i.e. in contact with the electrically conductive insert 126 of the recess 124. As a result, it becomes possible to use the chip unit 120 to detect whether the needle 112 is in its engaged position or not. In addition, the chip unit 120 can also comprise an alarm-generating device, which can be arranged on the chip unit 120 or at a suitable location in or on the housing 102, so that an alarm signal can be emitted if the needle 112 is opened without authorisation and/or by force.

In order to be able to counteract attempts at manipulation on the housing 102 itself, the chip unit 120 can also be operatively connected to a photodiode 128 accommodated in the housing 102, so that it can be detected if the housing halves 102*a* and 102*b* are separated from one another without authorisation, whereupon a corresponding alarm signal can likewise be emitted by the alarm-generating device.

Additionally or alternatively, the chip unit 120 can also be operatively connected to an external photodiode 130 in order to be able to detect when the product anti-theft device 100 is packed together with the protected product in a "booster bag", i.e. in a bag lined with an aluminium foil, without authorisation, whereupon in turn, the corresponding alarm signal can be emitted by the alarm-generating device.

It is also conceivable that the product anti-theft device 100 comprises a sensor unit 132, for example a Hall sensor unit, which is also operatively connected to the chip unit 120 and is designed and intended to detect a position and/or a displacement of the needle 112. In this way, an unauthorised displacement and/or manipulation of the needle can also be detected and the corresponding alarm signal can be emitted by the alarm-generating device.

The chip unit 120 can also be equipped with a signal-receiving unit and/or a signal-transmitting unit which is/are designed to preferably communicate with a customer's mobile terminal. For example, it is possible for the chip unit 120 to cause the wire 118 to be heated only after the signal-receiving unit comprised in the chip unit 120 has received a release initiation signal. The release initiation signal is preferably only sent by the mobile terminal to the signal-receiving unit when the customer has successfully completed a payment process.

Finally, the chip unit 120 can also have a memory unit which is preferably integrated into the chip unit and which memory unit is designed to store product information relating to the product that is to be protected, among other things. In order to display this product information, the product anti-theft device 100 can also comprise a display 134, indicated only schematically in FIG. 1, which display can preferably be arranged on an outer surface of the upper housing half 102*a*.

It should also be added that the product anti-theft device 100 can also comprise an electronic article surveillance element (EAS element for short), not shown, which EAS element is preferably also accommodated in the housing 102 and is designed to interact with an electronic article surveillance system, also not shown, so that if a customer tries to remove a protected product to which the product anti-theft device 100 is attached without authorisation, for example from a department store, the alarm signal is emitted as soon as the product is passed through a detector unit assigned to the electronic article surveillance system.

Finally, FIG. 4 is a schematic sectional view of part of an alternative embodiment of the locking mechanism 104 from FIG. 3. The alternative locking mechanism 104' comprises a slide 114' on which a toothing 114*a*' is formed. The toothing 114*a*' is provided to engage with a corresponding counter-toothing of a needle-receiving element (not shown in FIG. 4). This needle-receiving element can substantially correspond to the needle-receiving element 106 from FIG. 3, but the groove 106*a* is to be replaced by the corresponding counter-toothing. The slide 114' is displaceably arranged in a guide element 115' which is preferably fixedly mounted in the housing 102, which is indicated in FIG. 4 by a double arrow. To move the slide 114', the locking mechanism 104' also comprises a wire 118', which is also made of a shape memory alloy. The wire 118' has a positive and a negative pole and runs through the slide 114' or is operatively connected thereto in such a way that a shortening of the wire 118' leads to a displacement of the slide 114' within the guide element 115' in the direction the positive or negative pole. The slide 114' can additionally be guided along the direction of displacement on a guide 115*a*' of the guide element 115'. As a result, the toothing 114*a*' of the slide 114' and the corresponding counter-toothing on the needle-receiving element are disengaged, whereupon the needle-receiving element can be moved together with the needle in the manner described above and thus the product anti-theft device can be opened. To control the heating and thus the shortening of the wire 118', the wire 118' can be connected to the chip unit 120 in an analogous manner. After the heating of the wire 118' is stopped again, the slide 114' can be moved back into its starting position, again supported by a spring 116', which is supported on one end on the slide 114' and on the other end on the guide element 115', in which the toothing 114*a*' can engage with the corresponding counter-toothing of the needle-receiving element. It should also be mentioned that the toothing 114*a*' in the illustrated embodiment is designed in such a way that a movement of the needle-receiving element interacting with this toothing starting from the release position into the engaged position (downward in FIG. 4) is always permitted, whereas a movement of the needle-receiving element interacting with this toothing starting from the engaged position into the release position (upwards in FIG. 4) is only permitted if the toothing 114*a*' and the corresponding counter-toothing are disengaged, i.e. the slide 114' is shifted in the direction of the positive or the negative pole.

The invention claimed is:

1. Product anti-theft device which is designed to be attached to products that are to be protected, the product anti-theft device comprising:

a housing; and a locking mechanism, the locking mechanism comprising a needle, the needle being movable between an engaged position, in which it engages with the products that are to be protected, and a release position, in which it allows the product anti-theft device to be released and removed from the product that is to be protected, wherein:

the housing has a substantially flat form with a main plane;

the locking mechanism also comprises a needle-receiving element attached to the housing, on which needle-receiving element the needle is fixedly held and which needle-receiving element is displaceable in a direction substantially orthogonal to the main plane of the housing in order to transfer the needle from the engaged position into the release position and from the release position into the engaged position, the needle-receiving element being substantially fully accommodated in the housing when the needle is in the engaged position, the locking mechanism also comprises a locking element, wherein the locking element is a slide, which is arranged axially displaceable in the housing and which is designed in such a way that it can be brought into a releasable engagement connection with the needle-receiving element, so that the needle is fixedly held in the engaged position, and in that upon actuation by a release element operatively connected to the slide, the engagement connection is released, so that a displacement of the needle-receiving element and thus the transfer of the needle into the release position are permitted, and the release element is at least partially made of a shape memory alloy.

2. Product anti-theft device according to claim 1, wherein the locking element has at least one depression and/or at least one projection which is formed counter-shaped to at least one corresponding depression and/or at least one corresponding projection on the needle-receiving element.

3. Product anti-theft device according to claim 1, wherein the needle-receiving element is also designed in such a way that when the needle is in the release position, the needle-receiving element protrudes outwards from the housing in a direction substantially orthogonal to the main plane of the housing and, upon manual actuation by an operator, can be substantially fully accommodated in the housing, so that the needle is transferred into the engaged position.

4. Product anti-theft device according to claim 1, wherein the needle-receiving element and thus the needle are pre-loaded in the direction of the release position.

5. Product anti-theft device according to claim 4, wherein the needle-receiving element and thus the needle are pre-loaded in the direction of the release position by a spring.

6. Product anti-theft device according to claim 1, wherein the housing also has a recess which is designed and intended to receive a free end of the needle when the needle is in the engaged position.

7. Product anti-theft device according to claim 1, wherein the housing has a substantially circular and/or elliptical and/or teardrop-shaped or polygonal contour.

8. Product anti-theft device according to claim 6, wherein the recess has an insert made of an electrically conductive material.

9. Product anti-theft device according to claim 1, wherein the housing also has a cut-out designed to receive at least part of the product that is to be protected.

10. Product anti-theft device according to claim 9, wherein the cut-out extends radially.

11. Product anti-theft device according to claim 1, wherein the product anti-theft device also comprises an energy storage unit.

12. Product anti-theft device according to claim 11, wherein the product anti-theft device also comprises a signal-receiving unit, the product anti-theft device being designed to transfer the needle into the release position upon receipt of a release initiation signal by the signal-receiving unit.

13. Product anti-theft device according to claim 11, wherein the energy storage unit is a battery and/or a capacitor.

14. Product anti-theft device according to claim 11, wherein the product anti-theft device also comprises a memory device, the product anti-theft device also being designed to receive a product information signal and to store it on the memory device.

15. Product anti-theft device according to claim 11, wherein the product anti-theft device also comprises a signal-transmitting unit designed to transmit a product information signal to a mobile terminal in response to a product information request process.

16. Product anti-theft device according to claim 11, wherein the product anti-theft device also comprises an alarm-generating device, which is designed to emit an acoustic and/or visual alarm signal in response to attempted unauthorised removal of the product anti-theft device from the product that is to be protected.

17. Product anti-theft device according to claim 11, wherein the product anti-theft device also comprises a sensor unit attached to the housing, which sensor unit is designed and intended to detect a position and/or a displacement of the needle and/or of the needle-receiving element, and/or in that the product anti-theft device also comprises a photodiode attached to an inner portion of the housing and/or to an outer portion of the housing.

18. Product anti-theft device according to claim 17, wherein the sensor unit is a Hall sensor unit.

* * * * *